I. KONCZAK.
HAY SLING RELEASE.
APPLICATION FILED MAY 25, 1917.
1,239,700.
Patented Sept. 11, 1917.
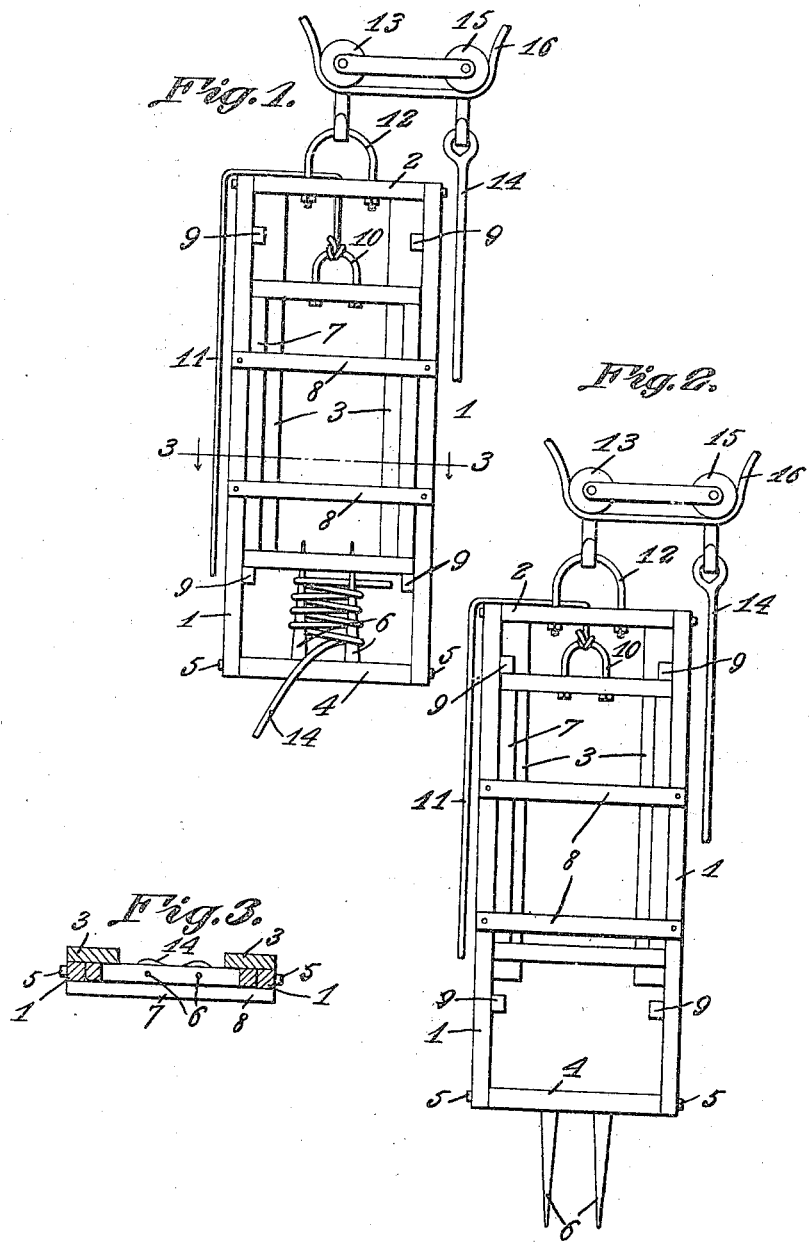
I. Konczak, Inventor

UNITED STATES PATENT OFFICE.

IGNATIUS KONCZAK, OF OSAKIS, MINNESOTA.

HAY-SLING RELEASE.

1,239,700. Specification of Letters Patent. Patented Sept. 11, 1917.

Application filed May 25, 1917. Serial No. 170,952.

*To all whom it may concern:*

Be it known that I, IGNATIUS KONCZAK, a citizen of the United States, residing at Osakis, in the county of Douglas and State of Minnesota, have invented a new and useful Hay-Sling Release, of which the following is a specification.

The subject of this invention is a hay sling release wherein a reciprocating retaining bar coöperates with a rocking bar having radial prongs, and the objects of the invention are, first, to provide a hay sling release which will hold a rope without knotting or tying the rope, second, to provide a rocking bar formed with projecting prongs, and a reciprocating locking bar engaging the prongs, third, to provide a simple and efficient hay sling release.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawing, wherein:—

Figure 1 is a front elevation of a sling release constructed in accordance with my invention showing the same in locked position.

Fig. 2 is a similar view showing the device in sling released position.

Fig. 3 is a cross section taken on the line 3—3 of Fig. 1.

Referring to the drawing by numerals of reference:—

The sling release is composed of side bars 1—1 and a cross bar 2 connecting the side bars. These bars form the supporting frame. Secured to the side bars 1—1, at the rear sides thereof, are the inwardly extending, longitudinally disposed retaining strips 3. A bar 4 rocks, in one end of the supporting frame, on its trunnions 5 which are journaled in the side bars 1. The bar 4 has secured thereon two spaced, radially extending prongs 6.

A rectangular frame 7 reciprocates within the main frame to which it is confined by the retaining strips 3 and cross strips 8 which extend across the front of the frame and have their ends secured to the side bars 1. The reciprocating movement of the frame 7 is preferably limited by stops 9 which extend inwardly from each side bar 1. One end bar of the frame 7 is apertured to receive the ends of prongs 6 and lock the bar 4 in one position. To the other end bar is secured a connecting member 10 to which one end of a rope 11 is attached. The rope 11 passes through a central aperture formed in the cross bar 2 and may be manually operated to raise the frame 7 and release the prongs 6.

Attached to the cross bar 2 of the main frame is a loop 12 by which the device may be suspended from a pulley 13 or other suitable supporting element. A sling rope 14 is shown as having one end attached to a pulley 15 while the other end may be wound about the prong 6.

In practice the device operates as follows:—The pulleys 13 and 15 are lowered on the rope 16 to proper position and the free end of the sling rope 14 passed under the hay to be elevated. The end of rope 14 is then wound in and out about the prongs 6 and the frame 7 brought down until its lower cross bar engages the prongs. The hay may now be elevated and brought to the desired point when the rope 11 is pulled which raises the frame 7 and releases the prongs 6. This allows the bar 4 to rock so that the rope 14 will slip from the prongs and deliver the hay. The rope 14 is held by friction caused by the confined space between the prongs and the winding of the rope in and out about the prongs.

Having described my invention, what I claim as new and desire to secure by Letters-Patent, is:—

A hay sling release, comprising a main frame, a frame sliding within the main frame, a bar rocking within the main frame, spaced projections on the bar adapted to be engaged by the sliding frame, means for hanging the main frame, and means for drawing the sliding frame to projection releasing position.

In testimony that I claim the foregoing as my own, I have hereto affixed my signature in the presence of two witnesses.

IGNATIUS KONCZAK.

Witnesses:
F. H. BORCHERT,
C. E. BELDING.

Copies of this patent may be obtained for five cents each, by addressing the "Commissioner of Patents, Washington, D. C."